US005897294A

United States Patent [19]

Aoyama et al.

[11] Patent Number: 5,897,294

[45] Date of Patent: Apr. 27, 1999

[54] VANE FOR GAS TURBINE

[75] Inventors: Kuniaki Aoyama; Masao Terazaki, both of Takasago, Japan

[73] Assignee: Mitsubishi Jukogyo Kabushiki Kaisha, Tokyo, Japan

[21] Appl. No.: 08/875,176

[22] PCT Filed: Nov. 20, 1996

[86] PCT No.: PCT/JP96/03397

§ 371 Date: Oct. 14, 1997

§ 102(e) Date: Oct. 14, 1997

[87] PCT Pub. No.: WO97/19257

PCT Pub. Date: May 29, 1997

[30] Foreign Application Priority Data

Nov. 21, 1995 [JP] Japan .................................... 7-302788

[51] Int. Cl.[6] .................................. F01D 5/18; F02C 7/18

[52] U.S. Cl. ........................................................... 416/97 R

[58] Field of Search .................................... 416/90 R, 92, 416/97 R; 415/115

[56] References Cited

U.S. PATENT DOCUMENTS

| | | | |
|---|---|---|---|
| 3,540,811 | 11/1970 | Davis | 416/97 R |
| 3,554,663 | 1/1971 | Helms | 416/97 R |
| 3,619,082 | 11/1971 | Meginnis | 416/97 R |
| 3,644,060 | 2/1972 | Bryan | 416/97 R |
| 5,486,093 | 1/1996 | Auxier et al. | 416/97 R |
| 5,779,437 | 7/1998 | Abdel-Messeh et al. | 416/97 R X |

FOREIGN PATENT DOCUMENTS

| | | | |
|---|---|---|---|
| 2350624 | 5/1974 | Germany | 416/97 R |
| 49-93712 | 9/1974 | Japan . | |
| 51-77710 | 7/1976 | Japan . | |
| 60-32903 | 2/1985 | Japan . | |
| 2087980 | 6/1982 | United Kingdom | 416/97 R |

*Primary Examiner*—John E. Ryznic

*Attorney, Agent, or Firm*—Wenderoth, Lind & Ponack, L.L.P.

[57] ABSTRACT

A gas turbine blade having a plurality of shower head cooling holes (1), bored in a blade leading edge portion, are arranged along a single line which is biased so as to correspond to the direction of swirling flow in a combustor. The swirling flow is clockwise or counter-clockwise. In particular, if the flow is clockwise, the cooling holes (1) are biased to the left hand side, as seen from upstream of the blade, toward a blade hub side (HS) from a blade tip side (TS). Also, if the flow is counter-clockwise, the cooling holes (1) are arrayed on one line which is biased to the reverse side relative to the latter case. The influence of the swirling flow is thus avoided, and the pressure at each position of the cooling holes (1) is constant, so that uniform cooling can be attained.

11 Claims, 4 Drawing Sheets

VANE FOR GAS TURBINE

BACKGROUND OF THE INVENTION

1. Field of the Invention

The present invention relates to a gas turbine blade having a shower head cooling mechanism.

2. Description of the Prior Art

In an air cooled blade of a high temperature gas turbine, film cooling has now become established as an indispensable art. With reference to FIGS. 3 and 4, a conventional type of cooling is illustrated. FIG. 3 is a cross sectional view of the an air cooled blade, and FIG. 4 is a perspective view showing an arrangement of shower head cooling holes in a blade leading edge portion.

Generally in a high temperature gas turbine blade, as shown in FIG. 3, shower head cooling holes SC are provided in a blade leading edge portion. Film cooling holes FC are provided on an upstream side of the a blade dorsal portion and on a downstream side of a blade ventral portion and pin fin holes PC are provided in a blade trailing edge portion.

The shower head cooling holes SC, as shown in FIG. 4, are bored in a leading edge portion of a blade 2 so as to be arranged in a straight line toward a blade hub side HS from a blade tip side TS. Air is blown from the cooling holes in an opposite direction relative to the gas flow.

Shower cooling and film cooling relate to an art that enhances cooling efficiency by covering a blade surface with a cooling air that is blown over a gas flow surface.

If the cooling air is blown too strongly, however, the cooling air causes a peeling from the blade surface so as to mix with a main flow of the gas which results in a reduced effect of the film cooling, or if the cooling air is blown too weakly, it will not provide a proper cooling effect due to a shortage of the cooling air amount. Accordingly, these considerations must be taken into account so that the blade surface will be covered by an optimal film of air.

SUMMARY OF THE INVENTION

As mentioned above, if the shower head cooling holes SC are provided so as to oppose the direction of gas flow, there occurs a difference in a pressure distribution of gas between the blade tip side TS and the blade hub side HS according to the direction of swirling flow in a corresponding combustor.

On the other hand, as the pressure of the film cooling air is supplied at a constant level, there is a location where only a small differential pressure can be obtained, i.e., at a mid place between the tip portion and the hub portion. For this reason, there is a problem that flow velocity of the cooling air that is blown from the cooling holes is reduced, and thereby the cooling effect is adversely impacted.

It is therefore an object of the present invention to provide a gas turbine blade which solves the above problems and attains uniform cooling of the blade, and maintains a constant pressure irrespective of the location of the cooling holes.

In order to attain the object, the present invention provides a gas turbine blade in which a plurality of shower head cooling holes are bored in a blade leading edge portion. The cooling holes are arranged on one line so as to be biased either to a left hand side or to a right hand side, as seen from upstream of the blade, toward a blade hub side from a blade tip side according to direction of swirling flow in combustor. Thus, taking account of the direction of the swirling flow in the combustor which is disposed upstream of the blade, the shower head cooling holes are arranged on a line that is biased to the left hand side or to the right hand side, as seen from upstream, toward the blade hub side from the blade tip side. Thereby the gas pressure at each location of the cooling holes becomes constant in a blade height direction and the differential pressure from the cooling air pressure also becomes constant, and thus uniform cooling of the blade becomes attainable.

Also, the present invention provides a gas turbine blade in which the plurality of shower head cooling holes are arranged on one line so that the shower head cooling holes of the blade tip side are biased to the left hand side, as seen from upstream, of those of the blade hub side if the direction of swirling flow in the combustor is clockwise. Thus, if the direction of swirling flow in the combustor disposed upstream is clockwise, the shower head cooling holes are arranged on a line so that the shower head cooling holes of the blade tip side are biased to the left hand side, as seen from upstream, of those of the blade hub side. Thereby the gas pressure at each location of the cooling holes becomes constant in the blade height direction and the differential pressure from the cooling air pressure also becomes constant, and thus uniform cooling becomes attainable.

Also, the present invention provides a gas turbine blade in which the plurality of shower head cooling holes are arranged on one line so that the shower head cooling holes of the blade tip side are biased to the right hand side, as seen from upstream, of those of the blade hub side if the direction of swirling flow in the combustor is counter-clockwise. Thus, if the direction of swirling flow in the combustor disposed upstream is counter-clockwise, the shower head cooling holes are arranged on a line so that the shower head cooling holes of the blade tip side are biased to the right hand side, as seen from upstream, of those of the blade hub side. Thereby the gas pressure at each location of the cooling holes becomes constant in the blade height direction and the differential pressure from the cooling air pressure also becomes constant, and thus uniform cooling becomes attainable.

Also, the present invention provides a gas turbine blade in which cooling air is blown from the plurality of shower head cooling holes so as to cool a blade surface. Thus, air is employed as a cooling medium and is blown from the shower head cooling holes for cooling the blade surface, thereby a desired cooling effect can be reliably attained in the desired amounts.

DETAILED DESCRIPTION OF THE INVENTION

Figure 1:
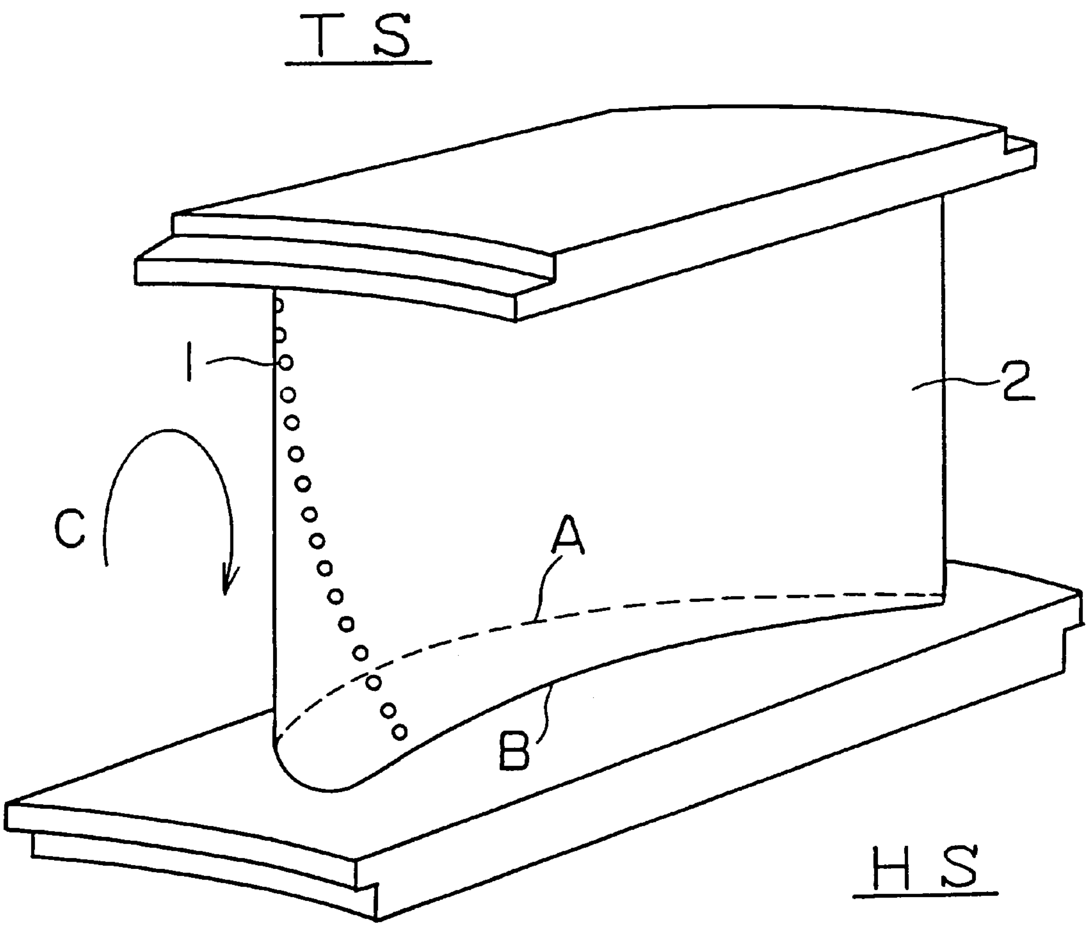
FIG. 1 is a perspective view of a gas turbine blade having a plurality of shower head cooling holes disposed in accordance with one embodiment of the present invention.
Figure 2:
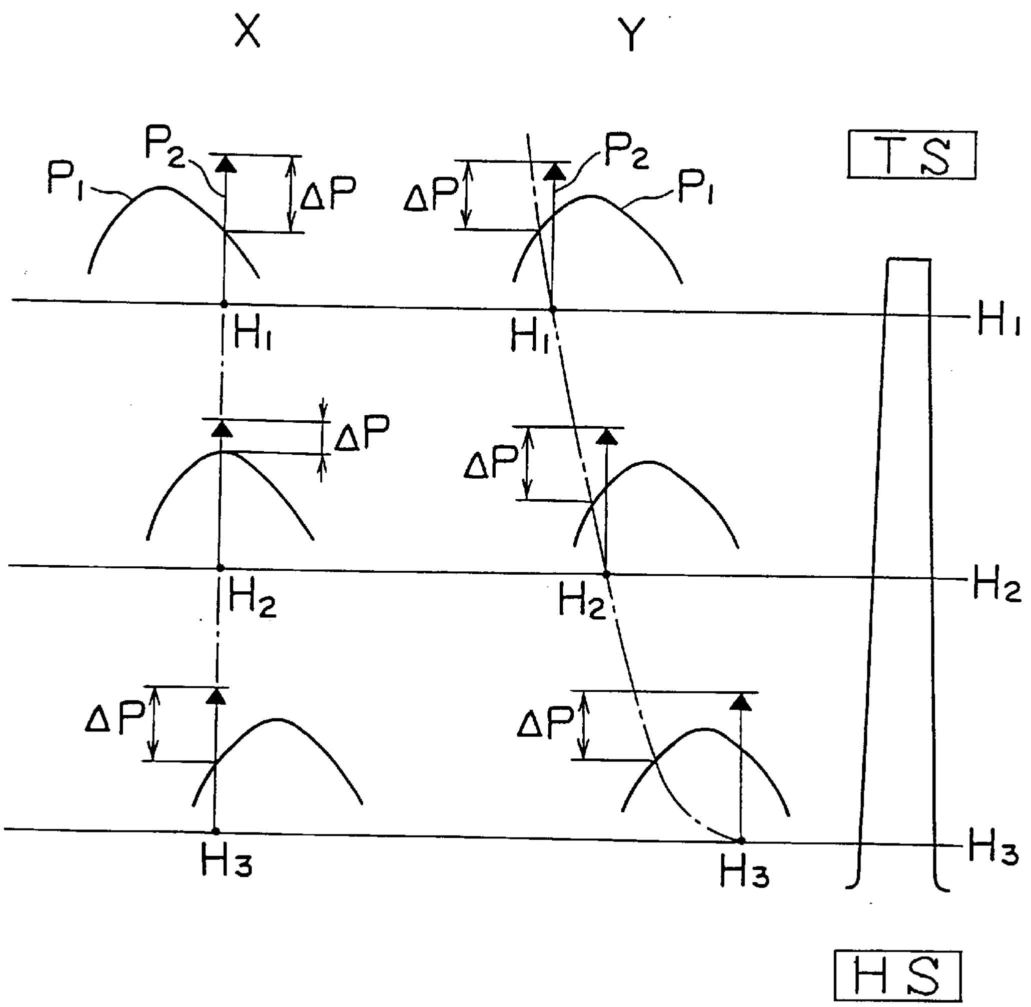
FIG. 2 is an explanatory view showing pressure states at three positions of the shower head cooling holes of FIG. 1 in comparison with a prior art array of shower head cooling holes.
Figure 3:
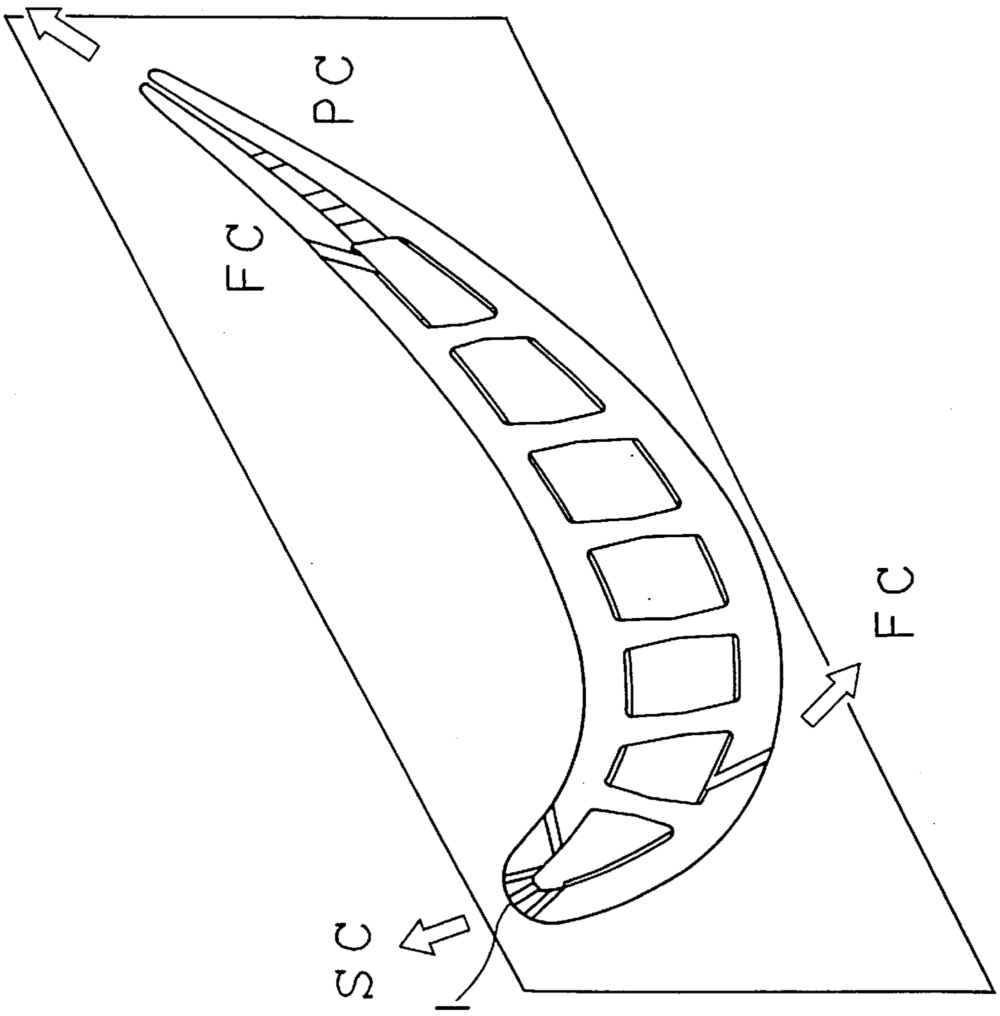
Fig. 3 (Prior Art)
FIG. 3 is a cross sectional view showing an air cooling structure of a prior art gas turbine blade.
Figure 4:
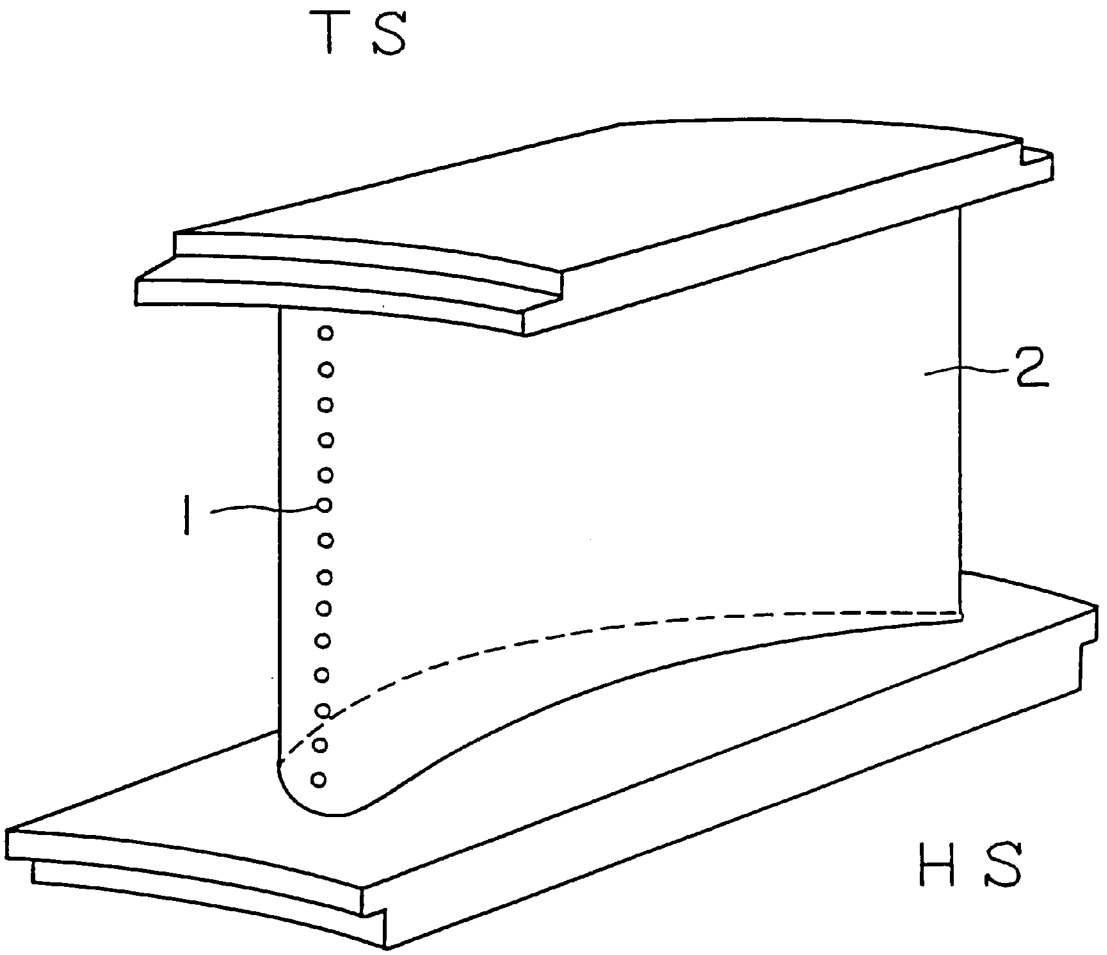
Fig. 4 (Prior Art)
FIG. 4 is a perspective view showing shower head cooling holes of a prior art gas turbine blade.

A description is made below of one preferred embodiment according to the present invention with reference to FIGS. 1 and 2. FIG. 1 is a perspective view of an air cooled blade of a gas turbine, and FIG. 2 is an explanatory view showing the pressure states at three positions of cooling holes of the present embodiment in comparison with prior art cooling holes.

Numeral 1 designates a shower head cooling hole. A plurality of cooling holes 1 are bored in a leading edge portion of a blade 2 so as to be arrayed in a line from a blade tip side TS to a blade hub side HS. The shower head cooling holes 1 are arrayed with the position of succeeding holes deviating or shifting from the position of the preceding hole so as to correspond to a direction of swirling flow in a combustor as shown by arrow C in FIG. 1.

That is, if the direction of swirling flow is clockwise, as shown by arrow C, the shower head cooling holes 1 of the blade tip side TS are biased to a left hand side (blade dorsal side in this embodiment) A, as seen from an upstream side of the blade. Also, the shower head cooling holes 1 on the blade hub side HS are located on the right hand side (blade ventral side in this embodiment) B, as seen from an upstream side of the blade. It is to be noted that, although not specifically shown in the figure, if the direction of swirling flow in the combustor is counter-clockwise, the shower head cooling holes 1 are bored so as to be disposed in an arrangement which is the reverse of that shown in FIG. 1.

In the present embodiment, the shower head cooling holes 1 are arranged so as to correspond to the direction of swirling flow, as mentioned above. In FIG. 2, state of air flow and pressure change along the blade of FIG. 1 is shown in comparison with a prior art blade in which the cooling holes are arrayed in a straight line.

That is, as shown at position X on the left hand side of FIG. 2, the prior art blade, in which the cooling holes are bored along a straight line from the blade tip side TS toward the blade hub side HS, pressure $P_2$ of the cooling air is constant at respective positions on the straight line while there are changes of pressure distribution $P_1$, of the gas flow. Accordingly, there occur differences of a differential pressure $\Delta P$ thereof at different positions $H_1$, $H_2$ and $H_3$ in a height direction of the blade 2. Thus, different natures of flow are generated, which results in a less uniform cooling effect, especially at the blade position $H_2$, where the cooling effect is adversely affected due to lowering of the flow velocity of the cooling air.

On the other hand, in the present embodiment, the shower head cooling holes 1 are bored with a deviation or shift in the position between adjacent holes, taking account of the direction of swirling flow, so as to correspond to the pressure distribution of gas. Thereby as shown at position Y at the center of FIG. 2, a constant differential pressure $\Delta P$ relative to the cooling air pressure $P_2$ is obtained at each blade height position, $H_1$, $H_2$ and $H_3$. Thus, as the nature of flow is constant at any position, uniform cooling can be achieved and cooling efficiency can be further enhanced.

In the above, the present invention is described by use of the embodiment illustrated in the figures, but needless to mention, the present invention is not limited thereto but various modifications can be made to its definite structure within the scope of the appended claims.

According to the present invention as described above, in a high temperature gas turbine blade, when film cooling is to be achieved by blowing cooling air from shower head cooling holes, a constant pressure is obtained at each position of the cooling holes from the blade tip side to the blade hub side and thus the nature of flow of fluid at each position becomes uniform, so that uniform film cooling can be achieved. Thereby, high film cooling efficiency can be obtained and the reliability of the blade can be further enhanced.

We claim:

1. A gas turbine blade comprising:

a blade section having a blade tip side, a blade hub side, a blade dorsal side, a blade ventral side and a blade leading edge portion; and a plurality of shower head cooling holes formed in said blade leading edge portion, wherein said cooling holes are arranged along a single line which runs from said blade dorsal side at said tip side of said blade section to said blade ventral side at said hub side of said blade section.

2. The gas turbine blade as claimed in claim 1, wherein said shower head cooling holes are adapted to permit cooling to be blown therethrough in order to cool a surface of said blade section.

3. The gas turbine blade as claimed in claim 1, wherein said cooling holes are arranged for use with a combustor in which a direction of swirling flow is clockwise as viewed from upstream of said gas turbine blade.

4. The gas turbine blade as claimed in claim 3, wherein said shower head cooling holes are adapted to permit cooling to be blown therethrough in order to cool a surface of said blade section.

5. A gas turbine blade comprising:

a blade section having a blade tip side, a blade hub side, a blade dorsal side, a blade ventral side and a blade leading edge portion; and a plurality of shower head cooling holes formed in a leading edge portion of said blade section, wherein said cooling holes are arranged along a single line which runs from said blade ventral side at said tip side of said blade section to said blade dorsal side at said hub side of said blade section.

6. The gas turbine blade as claimed in claim 5, wherein said shower head cooling holes are adapted to permit cooling air to be blown therethrough in order to cool a surface of said blade section.

7. The gas turbine blade as claimed in claim 5, wherein said cooling holes are arranged for use with a combustor in which a direction of swirling flow is counter-clockwise as viewed from upstream of said gas turbine blade.

8. The gas turbine blade as claimed in claim 7, wherein said shower head cooling holes are adapted to permit cooling air to be blown therethrough in order to cool a surface of said blade section.

9. A gas turbine blade comprising:

a blade section having a left hand side and a right hand side as viewed from upstream of said gas turbine blade; and a plurality of shower head cooling holes arranged so as to achieve a constant differential pressure between cooling air pressure through each of said shower head cooling holes and the gas flow pressure acting on said blade section, said shower head cooling holes being formed in a leading edge portion of said blade member, wherein said cooling holes are arranged along a single line which is inclined so as to extend from one of said left or right hand sides of said blade section at a tip side of said blade member to the other of said left or right hand sides of said blade section at a hub side of said blade section.

10. The gas turbine blade as claimed in claim 9, wherein if said gas turbine blade is for use with a combustor in which swirling gas flow is clockwise, as viewed from an upstream position, then said cooling holes are disposed in said left hand side of said blade section at said tip side thereof and in said right hand side of said blade section at said hub side thereof.

11. The gas turbine blade as claimed in claim 9, wherein if said gas turbine blade is for use with a combustor in which swirling gas flow is counterclockwise, as viewed from an upstream position, then said cooling holes are disposed in said right hand side of said blade section at said tip side thereof and in said left hand side of said blade section at said hub side thereof.

* * * * *